United States Patent [19]

Uchida et al.

[11] Patent Number: 5,852,082
[45] Date of Patent: Dec. 22, 1998

[54] FLAME RETARDANT RESIN COMPOSITION

[75] Inventors: Kouji Uchida; Miki Takahashi, both of Toyohashi, Japan

[73] Assignee: Aicello Chemical Co., Ltd., Aichi, Japan

[21] Appl. No.: 776,223

[22] PCT Filed: May 23, 1996

[86] PCT No.: PCT/JP96/01358

§ 371 Date: Apr. 18, 1997

§ 102(e) Date: Apr. 18, 1997

[87] PCT Pub. No.: WO96/37548

PCT Pub. Date: Nov. 28, 1996

[30] Foreign Application Priority Data

May 23, 1995 [JP] Japan ..................................... 7-146896

[51] Int. Cl.$^6$ ................................ C08K 5/34; C08K 5/52
[52] U.S. Cl. ......................... 524/101; 524/127; 524/140; 524/141; 523/220; 523/223
[58] Field of Search ..................................... 523/220, 223; 524/101, 127, 140, 141

[56] References Cited

U.S. PATENT DOCUMENTS

| 5,204,393 | 4/1993 | Nalepa et al. | 524/101 |
| 5,475,041 | 12/1995 | Weil et al. | 524/100 |
| 5,510,059 | 4/1996 | Yuki et al. | 524/409 |

FOREIGN PATENT DOCUMENTS

| 54-85242 | 7/1979 | Japan . |
| 6-157820 | 6/1994 | Japan . |

*Primary Examiner*—Kriellion S. Morgan
*Attorney, Agent, or Firm*—Knobbe, Martens, Olson & Bear, LLP

[57] ABSTRACT

A polyolefin-based flame retardant resin composition which emits no hazardous gases on combustion or incineration after use, requires no additional costs for treating ash, and has excellent flame resistance and mechanical strength is provided.

To 100 parts by weight of a polyolefin-based resin, 2 to 60 parts by weight of melamine cyanurate surface-treated by fine silica, and 1 to 30 parts by weight of a phosphoric acid ester are compounded.

12 Claims, No Drawings

FLAME RETARDANT RESIN COMPOSITION

[TECHNICAL FIELD]

The present invention relates to a flame retardant resin composition which emits no hazardous gases upon burning, produces only a small amount of ash, and excels in mechanical strength.

[BACKGROUND ART]

Conventional polyolefin-based flame retardant resin compositions known in the art contain: 1) magnesium hydroxide or aluminum hydroxide and utilize an endothermic reaction, whereby water of crystallization is released from magnesium hydroxide or aluminum hydroxide at 200°–350°C.; or 2) the combination of antimony trioxide and halogen compounds and utilize the so-called "free radical trapping effect" of antimony halides produced upon burning, and the dehydration-carbonation of antimony oxyhalides.

In order to obtain excellent flame resistance, these conventional polyolefin-based flame retardant resin compositions require magnesium hydroxide or aluminum hydroxide to be added in an amount equal to or greater than the amount of the polyolefin-based resin. The high content of aluminum hydroxide and/or magnesium hydroxide tends to decrease mechanical strength or processability and creates an excessive amount of ash when burnt during incineration after use, which increases costs for ash disposal. On the other hand, although the combination which has an effect by adding a small amount of antimony trioxide and halogen compounds has long been used, the problem of emitting hazardous gases upon burning has not been solved.

In view of environmental protection, demand has increased for a flame retardant resin composition which uses a non-halogen-based flame retardant and produces little ash upon incineration after use. A method was disclosed for imparting flame resistance by adding melamine cyanurate to the polyolefin-based resin in Japanese Patent Publication No. 59-50184. However, since melamine cyanurate alone has hydrophilic particle surfaces, affinity with and thus dispersion into the resin is poor when melamine cyanurate is added to the polyolefin-based resin, which decreases the mechanical strength of the resin and inhibits flame retarding properties.

In order to improve affinity with polyolefin-based resins, a method for imparting flame resistance to the polyolefin-based resins without decreasing mechanical strength was proposed in which melamine cyanurate is surface-treated with a nonionic surfactant having an HLB of 1 to 8 and is used in combination with a phosphorus compound (Japanese Patent Application Laid-Open No. 6-157820). This method of surface treatment using a surfactant was effective for improving the affinity of melamine cyanurate with resins. However, due to a relatively low molecular-weight, the surfactant presented on the surface of the melamine cyanurate easily migrates and diffuses through the resins in which it is dispersed. This results in poor appearance of the product. The amount of surfactant was decreased in order to minimize migration to the surface of the resins but affinity with the resins was lowered and the improvement of mechanical strength and flame resistance of the resins was also limited.

[DISCLOSURE OF THE INVENTION]

It is the object of the present invention to solve problems in the prior art and provide a flame retardant resin composition which emits no hazardous gases when burnt, produces only a small amount of ash and exhibits excellent mechanical strength.

Although melamine cyanurate has high flame resistance, it could not be compounded in an amount necessary for achieving sufficient flame resistance because the affinity of melamine cyanurate with polyolefin-based resins and dispersion into the resin is poor and the mechanical strength of the resins is decreased. The inventors of the present invention examined these problems and found that the mechanical strength of the resins decreased as the amount of melamine cyanurate surface-treated with fine silica increased. However, the degree of the reduction in mechanical strength was minimized and the flame resistance was improved by the additional use of a phosphoric acid ester, leading to the completion of the present invention.

That is, it was found that a flame retardant resin composition which emits no hazardous gases on burning, produces only a small amount of ash, causes no surfactant migration to the surface of the resin and excels in mechanical strength was obtained by compounding 2 to 60 parts by weight of melamine cyanurate surface-treated with fine silica and 1 to 30 parts by weight of a phosphoric acid ester to 100 parts by weight of a polyolefin-based resin.

The polyolefin-based resin used in the present invention can be selected from but is not limited to any of the following: olefin-based polymers such as polyethylene and polypropylene, or copolymers of ethylene and an a-olefin, vinyl acetate, acrylic acid, an acrylic acid ester, methacrylic acid, and a methacrylate acid ester. These resins may be used alone, or in combination with two or more resins.

Melamine cyanurate surface-treated with fine silica used in the present invention may be obtained by mixing melamine cyanurate powder with fine silica using a suitable mixer, for example, a Henschel mixer. In this case, fine silica has an average particle diameter preferably of 10 $\mu$m or less. Commercially available melamine cyanurate surface-treated with colloidal silica may also be used.

Phosphoric acid esters used in the present invention are not limited to a specific ester, and examples include but are not limited to the following: triphenyl phosphate, triglycidyl phosphate, polyphosphate compounds, resorcin polyphosphate compounds, trixylenyl phosphate, and triaryl phosphates.

In the flame retardant resin composition of the present invention, melamine cyanurate surface-treated with fine silica within a range between 2 and 60 parts by weight and a phosphoric acid ester within a range between 1 and 30 parts by weight are compounded with 100 parts by weight of a polyolefin-based resin. If the proportion of melamine cyanurate exceeds 60 parts by weight, the mechanical strength of the polyolefin-based resin composition decreases significantly and if the proportion of melamine cyanurate is less than 2 parts by weight, the flame retardant effect will be insufficient. If the proportion of the phosphoric acid ester exceeds 30 parts by weight, dispersion becomes poor and if the proportion of the phosphoric acid ester is less than 1 part by weight, the improvement of flame resistance and mechanical strength of the polyolefin-based resin composition will be insufficient.

The flame retardant resin composition of the present invention thus obtained has both excellent flame resistance and high mechanical strength due to the synergistic effect caused by the addition of both surface-treated melamine cyanurate and a phosphoric acid ester. That is, since the composition of the present invention excels in processability and has an acceptable appearance, it can be processed into various forms suitable for industrial uses such as containers, flexible/inflexible, sheets and films. Also, since the composition contains no halogen compounds, it emits no hazardous gases upon incineration after use and produces little ash, which means that no special treatment costs are required.

[BEST MODE FOR CARRYING OUT THE INVENTION]

[Embodiments]

The present invention will be described in detail referring to preferred embodiments.

[Examples 1–3]

To 100 parts by weight of ethylene-vinyl acetate copolymer (Sumitomo Chemical Co., Ltd., H 2020), the amounts shown in Table 1 of melamine cyanurate surface-treated with colloidal silica (Nissan Chemical Industries, Ltd., MC-440) and aromatic phosphoric acid ester oligomer (Daihachi Chemical Industries Co., Ltd., CR-733S) were blended under dry conditions and compounds were prepared using a biaxial extruder. These compounds were used "as is" to prepare sheets having a thickness of 200 μm by inflation at a processing temperature of 160° C. Results from tests conducted on these sheets are shown in Table 1 under the following categories; moldability, strength and elongation at break, oxygen index and the Fire Defense Agency Test.

[Examples 4–6]

To 100 parts by weight of ethylene-propylene random copolymer (Tonen Corp., E-401 E), the amounts shown in Table 1 of melamine cyanurate surface-treated with colloidal silica (Nissan Chemical Industries, Ltd., MC-440) and ammonium polyphosphate (Sumitomo Chemical Co., Ltd., Sumisafe P) were blended under dry conditions. Sheets were prepared in the same manner as in Examples 1–3 and their performances were evaluated. The results are shown in Table 1.

[Example 7]

To 100 parts by weight of high-density polyethylene (Mitsui Petrochemical Industries, Ltd., Hyzex 3300 F), the amounts shown in Table 1 of melamine cyanurate surface-treated with colloidal silica (Nissan Chemical Industries, Ltd., MC-440) and ammonium polyphosphate (Sumitomo Chemical Co., Ltd., Sumisafe P) were blended under dry conditions and compounds were prepared using a biaxial extruder. These compounds were used "as is" to form a parison of an outer diameter of 100 mm and a thickness of 4 mm by blow molding at a processing temperature of 220° C., and cylindrical containers of an outer diameter of 400 mm and a height of 400 mm were molded. The properties of the obtained containers were evaluated. The results are shown in Table 1.

[Comparative Example 1]

To 100 parts by weight of ethylene-vinyl acetate copolymer (Sumitomo Chemical Co., Ltd., H 2020), 20 parts by weight of melamine cyanurate surface-treated with colloidal silica (Nissan Chemical Industries, Ltd., MC-440) was blended under dry conditions and sheets were prepared in the same manner as in Examples 1–3 and their performances were evaluated. The results are shown in Table 2.

[Comparative Example 2]

To 100 parts by weight of ethylene-vinyl acetate copolymer (Sumitomo Chemical Co., Ltd., H 2020), 20 parts by weight of melamine cyanurate not surface-treated (Nissan Chemical Industries, Ltd., NC-600) and 6 parts by weight of aromatic phosphoric acid ester oligomer (Daihachi Chemical Industries Co., Ltd., CR-733S) were blended under dry conditions and sheets were prepared in the same manner as in Examples 1–3 and their performances were evaluated. The results are shown in Table 2.

[Comparative Example 3]

To 100 parts by weight of low-density polyethylene (Ube Industries, Ltd., F019), the amounts shown in Table 2 of melamine cyanurate (home produced, MC-1) surface-treated with sorbitan stearate (HLB: 5.2, Riken Vitamin Co., Ltd., S-250) and ammonium polyphosphate (Sumitomo Chemical Co., Ltd., Sumisafe P) were blended under dry conditions and sheets were prepared in the same manner as in Examples 1–3 and their performances were evaluated. The results are shown in Table 2.

TABLE 1

| | | Base resin | Melamine cyanurate (parts by weight) | Phosphoric acid ester (parts by weight) | Processability | Product appearance | Strength at break (kg/cm$^2$) | Elongation at break (%) | Oxygen index (%) | Fire Defence Agency Test |
|---|---|---|---|---|---|---|---|---|---|---|
| Example | 1 | EVA | NC-440 (20) | CR-733S (2) | ○ | ○ | 170 | 640 | 27 | Passed |
| | 2 | EVA | MC-440 (20) | CR-733S (4) | ○ | ○ | 180 | 680 | 28 | Passed |
| | 3 | EVA | MC-440 (20) | CR-733S (6) | ○ | ○ | 200 | 750 | 29 | Passed |
| | 4 | PP | NC-440 (20) | Sumisafe P (2) | ○ | ○ | 150 | 560 | 27 | Passed |
| | 5 | PP | MC-440 (20) | Sumisafe P (4) | ○ | ○ | 170 | 580 | 29 | Passed |
| | 6 | PP | MC-440 (20) | Sumisafe P (6) | ○ | ○ | 190 | 630 | 30 | Passed |
| | 7 | HDPE | MC-440 (20) | Sumisafe P (6) | ○ | ○ | 250 | 820 | 28 | Passed |

TABLE 2

| | | Base resin | Compounded material (parts by weight) | Processability | Product appearance | Strength at break (kg/cm$^2$) | Elongation at break (%) | Oxygen index (%) | Fire Defence Agency Test |
|---|---|---|---|---|---|---|---|---|---|
| Comparative Example | 1 | EVA | MC-440 (20) | ○ | ○ | 130 | 410 | 25 | Passed |
| | 2 | EVA | NC-600 (20) + CR-733S (6) | x | x | 80 | 130 | 23 | Failed |
| | 3 | LDPE | MC-1 (20) + Sumisafe P (6) | ○ | x | 110 | 350 | 26 | Failed |

Legend

Processability: The ease of inflation and blow molding was evaluated.

0: Long time operation is possible without any problems x: Long time operation is impossible due to bubble or hole formation Product appearance: Migration to the surface of the product was visually checked.

0: No visible migration; acceptable appearance x: Visible migration; poor appearance Strength at break: Measured in accordance with JIS Z1702

Elongation at break: Measured in accordance with JIS Z1702

Oxygen index: Measured in accordance with JIS K7201

Fire Defense Agency Test: Flame retardant test using the 45-degree micro-burner method in accordance with the Flame Retardant Test Standards from the Fire Defense Agency of the Ministry of Home Affairs.

As Tables 1 and 2 show, the flame resistance and mechanical strength of the flame retardant polyolefin-based resin composition of the present invention are significantly improved due to the synergistic effect of surface-treated melamine cyanurate and a phosphoric acid ester. Since the resin composition of the present invention has good processability and product appearance, it can be processed into various forms for industrial uses, such as containers, plates, sheets, and film.

Moreover, since this resin composition contains no halogen compounds, it emits no hazardous gases and produces little ash upon incineration after use, meaning that no special costs are required for treatment and that the composition is effective in the prevention of environmental contamination.

We claim:

1. A flame retardant resin composition consisting essentially of:

100 parts by weight of polyolefine-based resin;

2 to 60 parts by weight of melamine cyanurate surface-treated with fine silica; and 1 to 30 parts by weight of phosphoric acid ester.

2. A flame retardant resin composition according to claim 1, wherein said polyolefine-based resin is polyethylene or polypropylene.

3. A flame retardant resin composition according to claim 1, wherein said polyolefine-based resin is a copolymer of ethylene and another compound selected from the group consisting of α-olefin, vinyl acetate, acrylic acid, acrylic acid ester, methacrylic acid, and methacrylate acid ester.

4. A flame retardant resin composition according to claim 1, wherein said surface-treated melamine cyanurate is obtained by mixing melamine cyanurate powder with fine silica.

5. A flame retardant resin composition according to claim 4, wherein said fine silica has an average particle diameter of 10 $\mu$m or less.

6. A flame retardant resin composition according to claim 4, wherein said surface-treated melamine cyanurate is melamine cyanurate surface-treated with colloidal silica.

7. A flame retardant resin composition according to claim 1, wherein said phosphoric acid ester is selected from the group consisting of triglycidyl phosphate, polyphosphate compounds, trixylenyl phosphate, and triaryl phosphate.

8. A flame retardant resin composition according to claim 1, said resin composition consisting of said polyolefine-based resin, said surface-treated melamine cyanurate, and said phosphoric ester.

9. A flame retardant resin composition comprising:

100 parts by weight of polyolefine-based resin;

2 to 60 parts by weight of melamine cyanurate surface-treated with fine silica; and 1 to 30 parts by weight of phosphoric ester; wherein the weight ratio of the phosphoric ester and the melamine cyanurate is from 1:10 to 3:10.

10. A flame retardant resin composition according to claim 9, said resin composition consisting essentially of said polyolefine-based resin, said surface-treated melamine cyanurate, and said phosphoric ester.

11. A flame retardant resin composition comprising:

100 parts by weight of polyolefine-based resin;

2 to 60 parts by weight of melamine cyanurate surface-treated with fine silica; and 1 to 30 parts by weight of phosphoric ester, said phosphoric ester; wherein said phosphoric acid ester is selected from the group consisting of triglycidyl phosphate, resorcin polyphosphate compounds, trixylenyl phosphate, and triaryl phosphate.

12. A flame retardant resin composition according to claim 11, said resin composition consisting essentially of said polyolefine-based resin, said surface-treated melamine cyanurate, and said phosphoric ester.

* * * * *

UNITED STATES PATENT AND TRADEMARK OFFICE
CERTIFICATE OF CORRECTION

PATENT NO. : 5,852,082
DATED : December 22, 1998
INVENTOR(S) : Koui Uchida and Miki Takahashi It is certified that error appears in the above-indentified patent and that said Letters Patent is hereby corrected as shown below:

Column 5/line 41, delete "acid".

Signed and Sealed this

Third Day of April, 2001

Attest:

NICHOLAS P. GODICI

Attesting Officer     Acting Director of the United States Patent and Trademark Office